(12) United States Patent
Aoki et al.

(10) Patent No.: US 8,899,200 B2
(45) Date of Patent: Dec. 2, 2014

(54) VALVE SPRING RETAINER FOR AN INTERNAL COMBUSTION ENGINE AND A METHOD OF MANUFACTURING THE SAME

(75) Inventors: Takayuki Aoki, Shizuoka (JP); Takeshi Sassa, Shizuoka (JP)

(73) Assignee: Fuji Oozx Inc., Shizuoka (JP)

( * ) Notice: Subject to any disclaimer, the term of this patent is extended or adjusted under 35 U.S.C. 154(b) by 89 days.

(21) Appl. No.: 13/265,125

(22) PCT Filed: Apr. 27, 2010

(86) PCT No.: PCT/JP2010/057477
§ 371 (c)(1),
(2), (4) Date: Oct. 18, 2011

(87) PCT Pub. No.: WO2011/135676
PCT Pub. Date: Nov. 3, 2011

(65) Prior Publication Data
US 2012/0132841 A1 May 31, 2012

(51) Int. Cl.
*F01L 3/10* (2006.01)
*F01L 1/46* (2006.01)
*F16F 1/12* (2006.01)

(52) U.S. Cl.
CPC . *F01L 1/462* (2013.01); *F01L 3/10* (2013.01); *F16F 1/126* (2013.01); *F01L 2101/00* (2013.01)
USPC .................................. 123/90.67; 123/90.48

(58) Field of Classification Search
CPC .......... F01L 1/462; F01L 3/10; F01L 2101/00; F16F 1/126
USPC ........... 123/90.67, 90.48, 90.55, 90.59, 90.52
See application file for complete search history.

(56) References Cited

U.S. PATENT DOCUMENTS

| 6,371,063 | B2 * | 4/2002 | Oyama et al. ............... 123/90.11 |
| 7,468,107 | B2 * | 12/2008 | Tipps et al. .................... 148/233 |
| 2001/0047784 | A1 * | 12/2001 | Kobayashi et al. ........ 123/90.67 |
| 2006/0213472 | A1 | 9/2006 | Horimura et al. |
| 2010/0077983 | A1 * | 4/2010 | Yamada ..................... 123/188.9 |

FOREIGN PATENT DOCUMENTS

| JP | 5517976 U | 2/1980 |
| JP | 62185807 U | 11/1987 |
| JP | 10-037723 | 2/1998 |
| JP | 10-37723 A | 2/1998 |
| JP | 1003723 A | 2/1998 |
| JP | 2002303107 A | 10/2002 |
| JP | 2009052511 A | 3/2009 |

* cited by examiner

*Primary Examiner* — Zelalem Eshete
(74) *Attorney, Agent, or Firm* — Zarley Law Firm, P.L.C.

(57) ABSTRACT

Oxide film formed on a spring-retaining flange by heat treatment gets unlikely to peel off, thereby improving wear resistance of a contact surface of the spring-retaining flange with a valve spring. The oxide film 15 of the part of the spring-retaining flange 3 with the valve spring 7 is at least partially removed to make thickness of the oxide film to 0.00 to 0.02 µm.

3 Claims, 6 Drawing Sheets

VALVE SPRING RETAINER FOR AN INTERNAL COMBUSTION ENGINE AND A METHOD OF MANUFACTURING THE SAME

BACKGROUND OF THE INVENTION

The present invention relates to a valve spring retainer used in a valve train of an internal combustion engine, and particularly to a valve spring retainer produced from metal sheet and a method of manufacturing it.

The valve spring retainer made of metal sheet is lightened to reduce inertial mass of the valve train thereby improving the performance of the internal combustion engine in JP55-17976A, JP62-185807A and JP2002-303107A.

In the valve spring retainer made of metal sheet, a steel sheet is molded by a press and an original of the valve spring retainer is formed. In order that wear resistance is improved, its surface is hardened The original is generally treated with heat such as carburizing, quenching and tempering.

By heat treatment, a carburized layer is formed on the surface of the valve spring retainer. At the same time, carburizing is carried out in an ordinary carburizing furnace other than a vacuum carburizing furnace, so that an oxide film is formed on the surface of the carburized layer. The oxide film provides hardness, so that a spring-retaining flange in the valve spring retainer pressed by the upper end of the valve spring is improved in wear resistance.

However, the spring-retaining flange is always in contact with the end face of the valve spring during running of the engine. When the valve spring is compressed, bending stress is exerted to the spring-retaining flange, which is flexed. The spring-retaining flange relatively slides on the valve spring. The oxide film formed on the part of the valve-retaining flange pressed by the upper end of the valve spring peels off. By grinding effect of the peeled oxide, the contact surface between the spring-retaining flange and the valve spring can be worn. The thicker the oxide film is, the more likely the problem occurs.

Particularly, the valve spring retainer made of metal sheet is thin, so that it is necessary to prevent wear of the spring-retaining flange as much as possible.

SUMMARY OF THE INVENTION

In view of the disadvantages, it is an object of the invention to provide a valve spring retainer in which oxide film formed on a spring-retaining flange by heat treatment is unlikely to peel off thereby improving wear resistance of a contact surface between the spring retaining flange and a valve spring.

It is another object of the invention to provide a method of manufacturing the valve spring retainer as above.

According to one aspect of the present invention, there is provided a valve spring retainer, there is provided a valve spring retainer made of metal sheet in an internal combustion engine, the valve spring retainer comprising:

a frusto-conical part having a taper hole; and a spring-retaining flange pressed by an upper end of a valve spring, wherein carburizing, quenching and tempering are applied to the valve spring retainer to form oxide film, the oxide film being at least partially removed at part of the spring-retaining flange pressed by the upper end of the valve spring to allow thickness of the oxide film to be 0.00-0.02 μm.

According to another aspect of the present invention, there is provided a method of manufacturing a valve spring retainer made of metal sheet in an internal combustion engine, the valve spring retainer comprising a frusta-conical part having a taper hole, and a spring-retaining flange pressed by an upper end of a valve spring, the method comprising:

drawing a circular metal sheet to mold an original of the valve-spring retainer;

carburizing the original;

quenching the original;

tempering the original to form oxide film on a surface; and removing the oxide film on part of the spring-retaining flange pressed by the upper end of the valve spring so that thickness of the oxide film is 0.00 to 0.02 μm.

According to the present invention, the oxide film formed on the spring-retaining flange by heating gets more unlikely to peel off, thereby improving wear resistance of the contact surface of the spring-retaining flange with the valve spring.

According to the present invention, the oxide film formed on the spring-retaining flange by heating gets more unlikely to peel off, thereby improving wear resistance of the contact surface of the spring-retaining flange with the valve spring.

DETAILED DESCRIPTION OF THE PREFERRED EMBODIMENT OF THE INVENTION

Embodiments of the present invention will be described with respect to the drawings.

Figure 1:
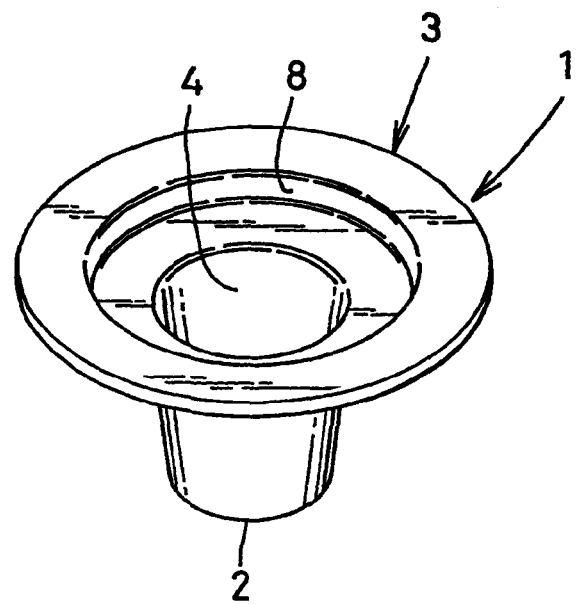
FIG. 1 is a perspective view of one embodiment of a valve spring retainer according to the present invention.
Figure 2:
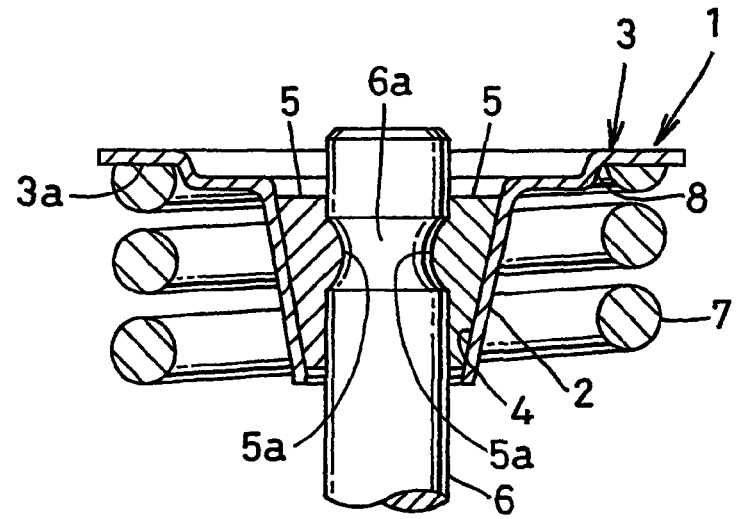
FIG. 2 is a central vertical sectional front view of a valve train with the valve spring retainer.

FIG. 1 is a perspective view of one embodiment of a valve spring retainer according to the present invention, and FIG. 2 is a central vertical sectional view of a valve train in which the valve spring retainer is mounted.

The valve spring retainer 1 is molded from low carbon steel sheet having thickness of 1.2-1.6 mm mainly by deep drawing, and comprises an inverted frusto-conical part 2 and an outward spring-retaining flange 3 at the upper end thereof.

Inward beads 5a, 5a of a pair of cotters 5,5 held in a taper hole 4 of the frusto-conical part 2 engage in annular groove 6a to allow the valve spring retainer 1 to be coupled to a poppet valve 6.

The upper end of a valve spring 7 the lower end of which is supported on a cylinder head (not shown) is in contact with the lower surface 3a close to the outer circumference of the spring-retaining flange 3, so that the poppet valve 6 is forced upward.

An annular guide 8 is formed in the middle of the valve-retaining flange 3, and the upper end of the valve spring 7 is in contact with the horizontal lower surface close to the circumference. The guide 8 prevents the upper end of the valve spring 7 from moving radially and provides large section modulus to increase bending rigidity of the spring-retaining flange 3. The guide 8 may preferably be 1.5-2.5 mm long.

Figure 3:
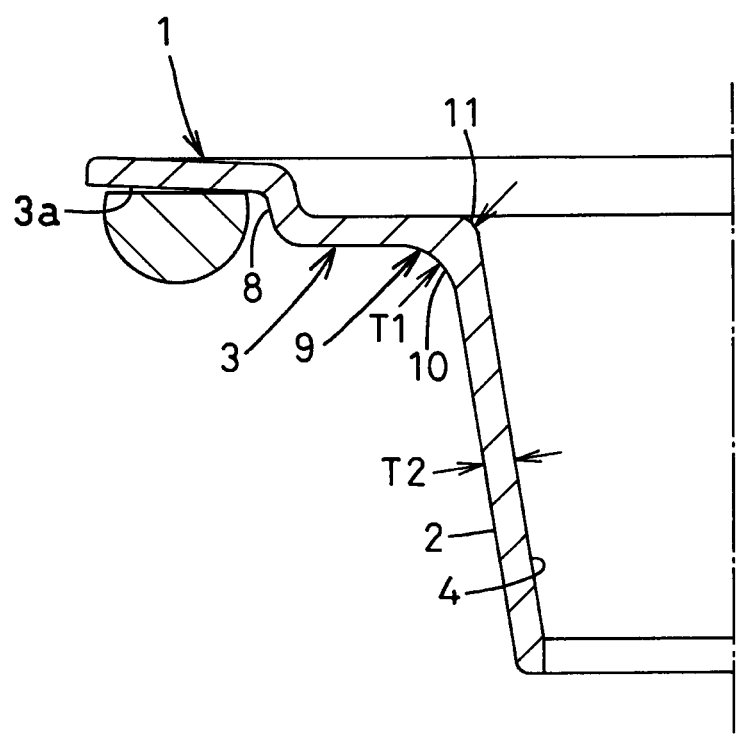
FIG. 3 is an enlarged sectional view of the valve spring retainer.

As shown in FIG. 3, the thickness T1 of a corner 9 between the frusto-conical part 2 and the spring-retaining flange 3 is larger than the thickness T2 of the frusto-conical part 2. At the corner 9 between the frusto-conical part 2 and the spring-retaining flange 3, an outer surface 10 is an arc with a radius of curvature which is larger than the thickness of the frusto-conical portion 2. An inner surface 11 which faces the outer surface 10 is an arc with a radius of curvature which is larger than the radius of curvature of the inner surface 10, so that the thickness of the corner 9 is larger than the thickness of the frusto-conical portion 2.

The outer surface 10 of the corner 9 between the frusto-conical portion 2 and the spring-retaining flange 3 is the arc with the radius of curvature larger than the thickness of the frusto-conical portion 2, and the thickness T1 of the corner is larger than the thickness T2 of the frusto-conical portion 2, so that the corner 9 is strengthened with increased bending rigidity. Thus, stress is prevented from gathering to the part, so that fatigue strength of the corner 9 is improved.

The spring-retaining flange 3 becomes unlikely to be bent, thereby preventing the spring-retaining flange 3 from sliding on the valve spring 7.

The lower surface of the spring-retaining flange 3 which contacts the upper end of the valve spring 7 is tilted upward and outward away from the upper end of the valve spring 7, so that the upper inner circumference of the valve spring 7 contacts the inner part of the outer lower surface 3a of the spring-retaining flange 3. An angle of tilt with respect to the lower surface 3a may be less than 1.0 degree such that the inner circumference of the upper end of the valve spring 7 does not strongly contact the inner part of the outer lower surface 3a.

If the valve spring retainer 1 is molded from relatively thick plate having high bending rigidity or if the spring-retaining flange 3 is small in diameter in the valve spring retainer 3, the outer lower surface 3 may be horizontal.

By tilting the outer lower surface 3a of the spring-retaining flange 3, the outer lower surface 3a contacts the valve spring 7 at an inner point of the outer lower surface 3a thereby reducing bending moment which exerts the spring-retaining flange 3. The inner point is not likely to become flexing, thereby preventing the spring-retaining flange 3 from sliding on the valve spring 7 and improving fatigue strength of the valve-retaining flange 3.

In the valve spring retainer 1 after press molding, in order to improve wear resistance of the surface and strength of each part, heat treatment such as carburizing in a gas carburizing furnace, quenching and tempering is applied.

Figure 4:
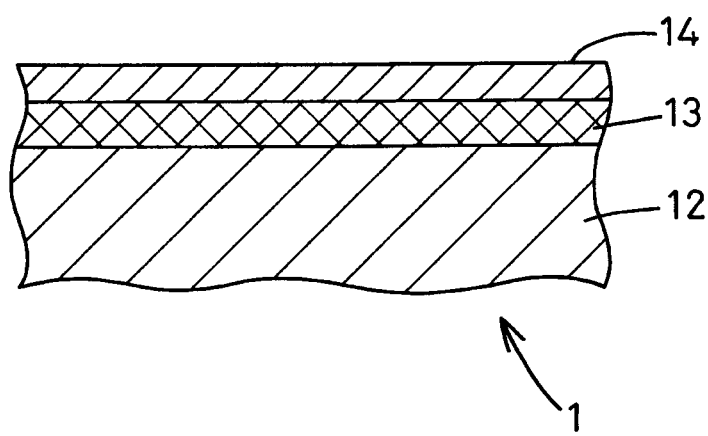
FIG. 4 is an enlarged sectional view of a surface layer.

FIG. 4 is an enlarged sectional view of surface layers of the valve spring retainer 1 after the heat treatment. An about –0.1-0.5 mm-thick carburized layer 13 which is formed on the whole surface of a matrix 12, and an about 0.2 μm-thick oxide film 14 is formed on the carburized layer 13 with the heat treatment.

Figure 5:
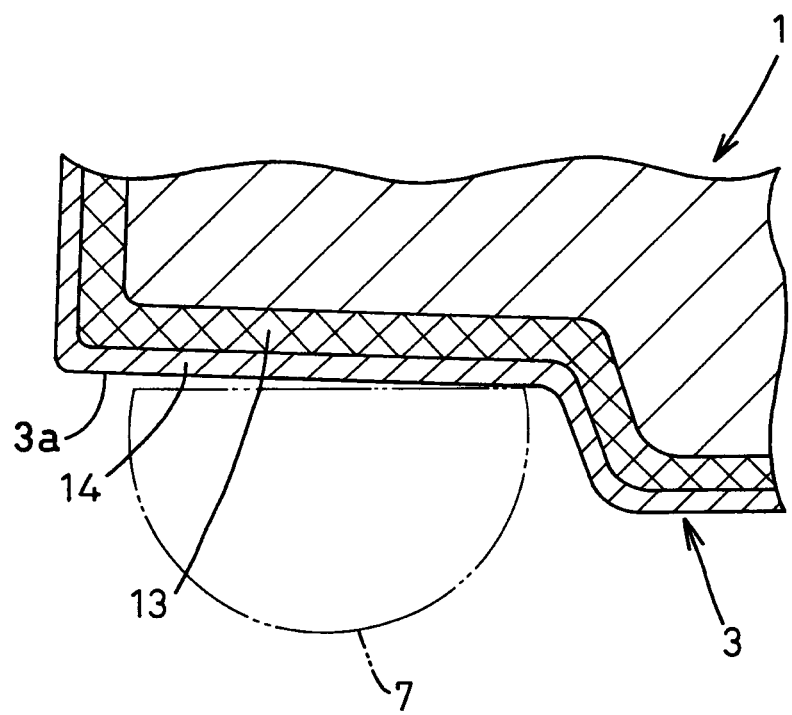
FIG. 5 is an enlarged sectional view of the lower surface of a spring-retaining flange.
Figure 6:
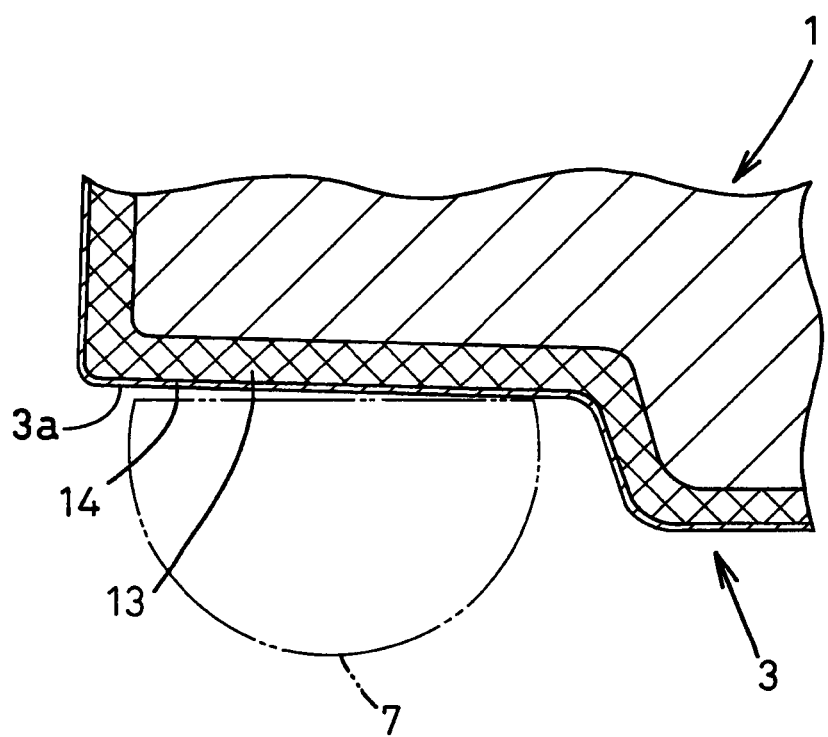
FIG. 6 is an enlarged sectional view of the lower surface of the spring-retaining flange after removing oxide film.

In the valve spring retainer 1 according to the present invention, in FIG. 5, the oxide film 14 formed on the whole surface including the outer lower surface 3a which is pressed by the upper end of the valve spring 7 is partially removed by mechanical means such as grinding so that the oxide film becomes thinner to the thickness of 0.00-0.02 μm.

With or after partially removing of the oxide film 14, at least the outer lower surface 3a pressed by the upper end of the valve spring 7 at the spring-retaining flange 3 is finished to have surface roughness or center-line average Ra under ISO4287 or JIS0601 of more than 1.20 μm.

Owing to the oxide film 14 having thickness of not more than 0.02 μm formed on the outer lower surface pressed by the upper end of the valve spring 7, the oxide film 14 on the lower surface of the spring-retaining flange 3 is prevented from peeling off or is unlikely to peel off even if the upper end of the valve spring 7 slides on the lower surface of the valve-retaining flange 3 during running of an engine.

Because of synergistic effect of the 0.00-0.02 μm thickness of the oxide film 14 on the outer lower surface 3a of the spring-retaining flange 3 with the not-more-than 1.20 μm center line average Ra on the outer lower surface 3a the oxide film 14 is more unlikely to peel off during sliding on the valve spring 7.

Why the center-line average Ra on the outer lower surface 3a pressed by the upper end of the valve spring 7 is not more than 1.20 μm is confirmed by the endurance tests to the engine proving that the average Ra beyond 1.20 μm increases sliding frictional resistance against the valve spring 7 to make the oxide film 14 likely to peel off.

Furthermore, as mentioned above, the spring-retaining flange 3 gets unlikely to flex, so that relative sliding of the contact surface with the valve spring 7 involved by the flexing is prevented. Thus, the oxide film 14 on the outer lower surface 3a of the spring-retaining flange 3 gets more difficult to peel off.

The oxide film 14 of the outer lower surface 3a pressed by the upper end of the valve spring 7 gets difficult to peel off. Owing to grinding effect of peeled oxide, the contact surface of the valve spring 7 with the spring-retaining flange 3, particularly the outer lower surface 3a of the spring-retaining flange 3 gets more unlikely to be worn. As a result, wear resistance on the lower surface of the spring-retaining flange 3 is improved, so that durability of the valve spring retainer 1 is greatly improved.

Figure 7:
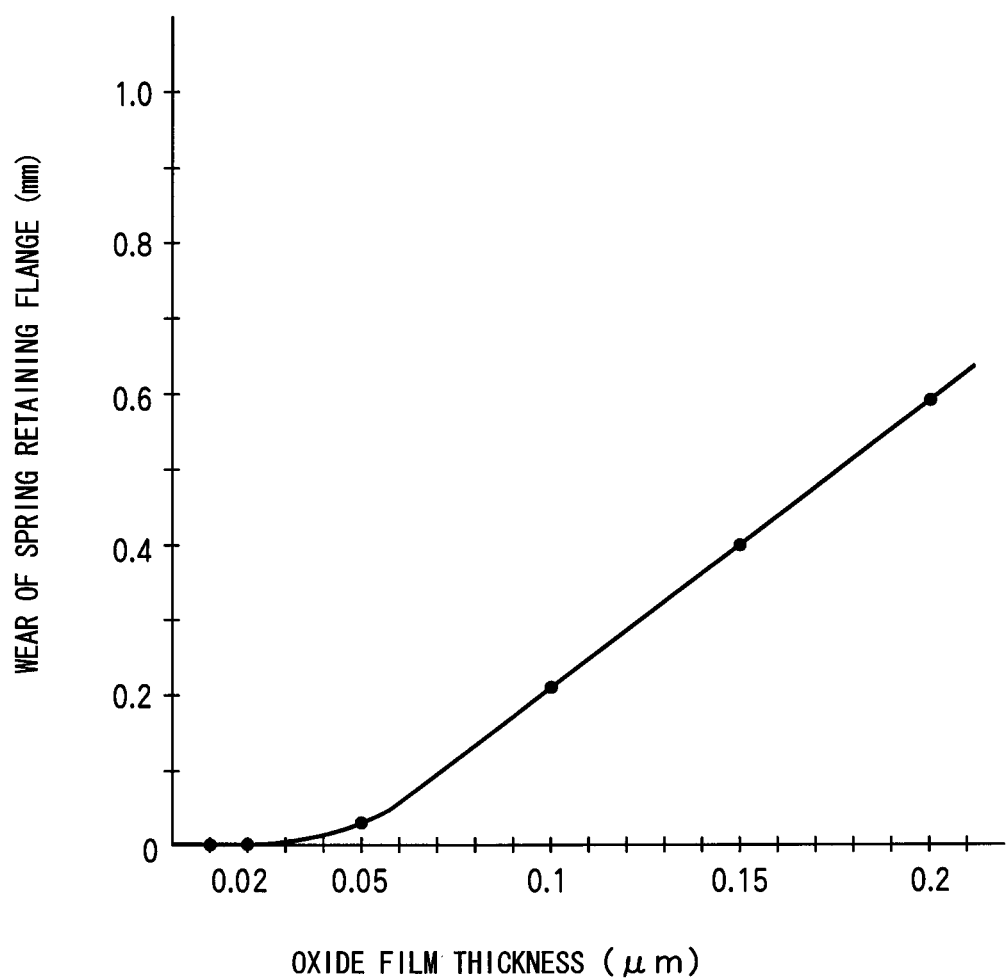
FIG. 7 is a graph showing the results of a wear test of the spring-retaining flange.

FIG. 7 is a graph of wear of the lower surface 3a of the spring-retaining flange 3 with respect to thickness of the oxide film 14 formed on the lower surface 3a of the spring-retaining flange 3, measured by endurance test of an engine. The thickness of the oxide film 14 was measured by auger spectrochemical analysis.

The engine in the endurance test is a gasoline engine of a 2000 cc displacement. The engine on a support operated for continuous 60 hours at rotation speed of 6000 r.p.m. under high load and was measured.

As clearly shown in FIG. 7, the lower surface 3a of the spring-retaining flange 3 did not wear at less than 0.02 μm or 0.00-0.02 μm as thickness of the oxide film 14. Beyond 0.02 μm as the thickness, the wear gradually increased, and beyond 0.05 μm, the wear of the lower surface 3a proportionally increased. Even when the thickness of the oxide film 14 is zero by removing all, the lower surface of the spring-retaining flange 3 does not wear owing to the hard carburized layer 13.

Figure 8:
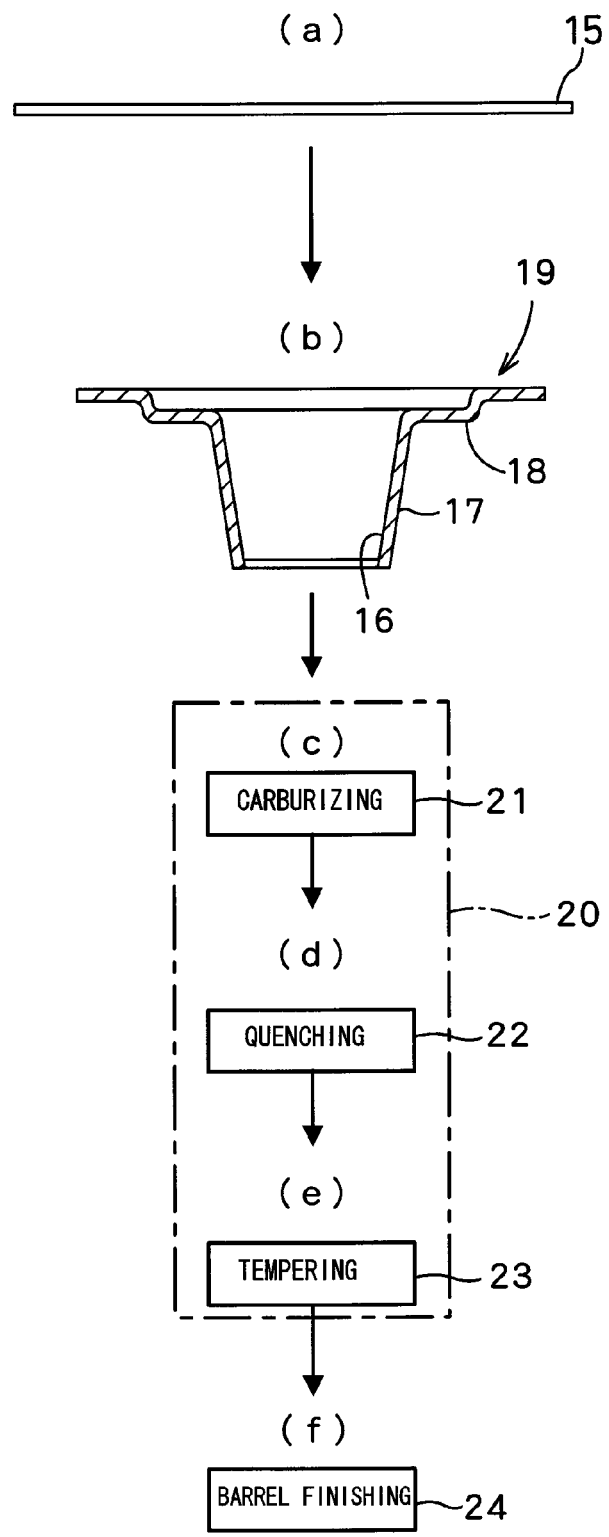
FIG. 8 is a diagram showing the steps of a method of manufacturing the valve spring retainer according to the present invention.

The valve spring retainer 1 is produced with the steps in FIG. 8.

A low-carbon steel disc 15 which is 1.2-1.6 mm thick in FIG. 8 (a) is molded with a single or a plurality of cooling or warming deep drawing steps by a press (not shown) to a retainer original 19 comprising a tubular portion 17 having a taper hole 16, and a spring-retaining flange 18 at the upper end of the tubular portion 17. The original 19 is the same as the valve spring retainer 1 in FIGS. 1-3 in shape.

Then, in a heating step 20 in FIGS. 8(c)-(e), carburizing 21, quenching 22 and tempering 23 are applied to the original 19. The carburizing 21 is carried out in a common gas carburizing furnace and tempering may be preferably carried out below 300 C.

Lastly, in an oxide film removing step in FIG. 8(f), barrel finishing 24 is carried out to the original 19. The oxide film formed by heating on the lower surface pressed by the upper end of the valve spring 7 is ground and removed to the thickness of 0.00-0.02 μm for predetermined time. Abrasives used in the barrel finishing 24 may be preferably fine particles of size of 1.0-2.0 μm such as alumina or ceramics, thereby providing the valve spring retainer 1 with the oxide film 14 of less than 0.02 μm on the lower surface of the spring-retaining flange 3. With the barrel finishing, center-line average Ra on the lower surface of the spring-retaining flange 3 can be made to less than 1.20 μm.

The barrel finishing is applied to the original 19 of the valve spring retainer treated with heat, and the oxide film on the surface except the lower surface of the spring-retaining flange 3 is removed simultaneously. The oxide film except the lower surface 3a of the spring-retaining flange 3 pressed by the upper end of the valve spring 7 does not affect sliding wear or does not peel off, so that it may remain without being removed.

Accordingly, the oxide film formed only on the lower surface of the spring-retaining flange 3 pressed by the upper end of the valve spring 7 may be ground and removed to the thickness of 0.00-0.02 μm without barrel finishing by another mechanical grinding means such as a grinding disc in which a grinding wheel is used.

What is claimed:

1. A valve spring retainer made of steel in an internal combustion engine, the valve spring retainer comprising:
   a frusto-conical part having a taper hole; and
   a spring-retaining flange pressed by an upper end of a valve spring,
   wherein carburizing, quenching and tempering are applied to the valve spring retainer to form oxide film, the oxide film being partially removed at part of the spring-retaining flange pressed by the upper end of the valve spring to allow thickness of the oxide film to be 0.00-0.02 μm, exclusive to zero;
   wherein a lower surface of the spring-retaining flange pressed by the upper end of the valve spring is tilted at an angle of less than 1.0 degree to rise away from a center of the valve spring retainer.

2. The valve spring retainer of claim 1 wherein a center line average Ra of the part of the spring-retaining flange pressed by the upper end of the valve spring is not more than 1.20 μm.

3. The valve spring retainer of claim 1 wherein an outer surface of a corner between the frusto-conical part and the spring-retaining flange is formed as an arc with a radius of curvature larger than thickness of the frusto-conical part, an inner surface of the corner facing the outer surface being formed as an arc smaller than the radius of curvature of the outer surface of the corner so that thickness of the corner is larger than the thickness of the frusto-conical part.

* * * * *